United States Patent
Horimoto et al.

(10) Patent No.: US 8,199,259 B2
(45) Date of Patent: Jun. 12, 2012

(54) VIDEO DISPLAY DEVICE

(75) Inventors: Masaki Horimoto, Osaka (JP);
Kazuhide Ishihara, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 636 days.

(21) Appl. No.: 12/404,471

(22) Filed: Mar. 16, 2009

(65) Prior Publication Data

US 2009/0237571 A1    Sep. 24, 2009

(30) Foreign Application Priority Data

Mar. 18, 2008  (JP) .................................. 2008-069771

(51) Int. Cl.
*H04N 5/268* (2006.01)

(52) U.S. Cl. ........ 348/706; 348/569; 348/554; 348/705; 725/80

(58) Field of Classification Search .......... 348/552–570, 348/705, 706, 725; 709/223, 224, 245; 710/62; 725/80

See application file for complete search history.

(56) References Cited

U.S. PATENT DOCUMENTS

| | | | |
|---|---|---|---|
| 7,378,984 B2 * | 5/2008 | Suzuki et al. | 340/12.51 |
| 2008/0297371 A1 * | 12/2008 | Ida | 340/825.52 |
| 2009/0091658 A1 * | 4/2009 | Hirose | 348/569 |

FOREIGN PATENT DOCUMENTS

| | | |
|---|---|---|
| JP | 2000-286880 | 10/2000 |
| JP | 2001-007824 | 1/2001 |
| JP | 2001-313875 | 11/2001 |
| JP | 2002-007306 A | 1/2002 |
| JP | 2002-217906 A | 8/2002 |
| JP | 2005-340968 | 12/2005 |
| JP | 2008-035189 A | 2/2008 |
| JP | 2008-035192 A | 2/2008 |

* cited by examiner

*Primary Examiner* — Michael Lee
(74) *Attorney, Agent, or Firm* — Pillsbury Winthrop Shaw Pittman, LLP (57) ABSTRACT

This video display device includes a maker name table and a device type table. Moreover, this video display device includes a communication means which, when some external input channel is selected, receives from a device upon that external input channel the logical address and the vendor ID which are allocated in advance to that device on that external input channel. This video display device also includes a conversion means which converts the vendor ID which has been received by the communication unit to a letter string representing a maker's name, on the basis of the maker name table. The conversion means also converts the logical address which has been received by the communication unit to a letter string representing the device type of the device, on the basis of the device type table. Furthermore, this video display device also includes a display means which displays those letter strings.

4 Claims, 8 Drawing Sheets

| VENDOR ID | MAKER NAME |
|---|---|
| 2009A4 | FUNAI |
| 2009B3 | SUNY |
| 2009C4 | PUNNY |
| ⋮ | ⋮ |

| ADDRESS | DEVICE |
|---|---|
| 0 | TV |
| 1 | RECORDING DEVICE 1 |
| 2 | RECORDING DEVICE 2 |
| 3 | TUNER 1 |
| 4 | PLAYBACK DEVICE 1 |
| 5 | AUDIO SYSTEM |
| 6 | TUNER 2 |
| 7 | TUNER 3 |
| 8 | PLAYBACK DEVICE 2 |
| 9 | RECORDING DEVICE 3 |
| 10 | TUNER 4 |
| 11 | PLAYBACK DEVICE 3 |
| 12 | RESERVED |
| 13 | RESERVED |
| 14 | FREE USE |
| 15 | UNREGISTERED(AS INITIATOR ADDRESS) BROADCAST(AS DESTINATION ADDRESS) |

| NAME | RANGE DESCRIPTION | | LENGTH | PURPOSE |
|---|---|---|---|---|
| [DEVICE TYPE] | "TV" | 0 | 1 BYTE | ALLOWS ADDITIONAL DEVICES, ABOVE THE NUMBER ALLOWED IN THE LOGICAL ADDRESSING MECHANISM, TO INDICATE THEIR DEVICE TYPE |
| | "RECORDING DEVICE" | 1 | | |
| | RESERVED | 2 | | |
| | "TUNER" | 3 | | |
| | "PLAYBACK DEVICE" | 4 | | |
| | "AUDIO SYSTEM" | 5 | | |

VIDEO DISPLAY DEVICE

CROSS REFERENCE

This Nonprovisional application claims priority under 35 U.S.C. §119(a) on Patent Application No. 2008-069771 filed in Japan on Mar. 18, 2008, the entire contents of which are hereby incorporated by reference.

BACKGROUND OF THE INVENTION

The present invention relates to a video display device according to the HDMI-CEC standard.

From the past, video display devices according to the HDMI-CEC standard (hereinafter termed the HDMI standard) have become generally widespread. Such a video display device is connected to a device according to the HDMI standard (hereinafter termed a HDMI device) with an interface according to the HDMI standard. And, in the HDMI standard, not only a digital format for transmission and reception of video signals and audio signals is prescribed, but also a digital format for transmission and reception of control signals is prescribed. Here the video display device may be, for example, a television. Moreover the HDMI device may be, for example, a DVD recorder or a DVD player.

When the power supply to the video display device described above is turned on or the like, it transmits and receives the above control signals to and from an HDMI device which is connected to the video display device. Due to this the video display device displays the channel number of its external input, such as "HDMI1", "HDMI2" or the like, as an OSD (On Screen Display). The user looks at this display and changes over to any desired external input channel.

It should be understood that, in Japanese Laid-Open Patent Publication 2001-313875, Japanese Laid-Open Patent Publication 2005-340968, and Japanese Laid-Open Patent Publication 2001-7824, there is disclosed a display device which displays a list of devices which are connected to the display device. Moreover, in Japanese Laid-Open Patent Publication 2000-286880, there is disclosed a display device which displays the flow of signals between itself and an AV device.

However, in recent years, the connection of a plurality of HDMI devices to a video display device has become more and more popular. Due to this, it quite often happens that the user does not remember what devices he himself has connected to the various external input channels. Moreover a video display device of the type described above does not go so far as to show the details of the HDMI devices which are connected to it, as described above. For example, the name of the maker who manufactured the HDMI device and the device type of the HDMI device and so on are not displayed.

Accordingly, even though the user is able to ascertain the channel numbers of the external inputs, he is not able to ascertain what types of HDMI devices are connected to the various external input channels. Thus, with a prior art type video display device, there has been the problem that the user sometimes mistakenly performs replay with an HDMI device using an external input channel which he did not want to use, and so on.

The object of the present invention is to provide a video display device, with which it is possible for the user to ascertain what types of HDMI devices are connected to the various external input channels.

SUMMARY OF THE INVENTION

The video display device according to the present invention includes a maker name table and a device type table. This maker name table is a table in which vendor IDs which specify makers who have manufactured devices which are connected to the video display device according to the HDMI standard, and names of those makers, are held in mutual correspondence. And this device type table is a table in which a plurality of logical addresses which are allocated in advance to all devices connected to the video display device, and device types of the all devices, are held in mutual correspondence. The device type table, for example, may be constructed in advance when the power supply to this video display device is turned on.

Moreover, this video display device includes a communication means which, when some external input channel is selected, receives from a device upon that external input channel the logical address and the vendor ID which are allocated in advance to that device on that external input channel, by communicating with that device upon that external input channel.

Yet further, this video display device includes a conversion means which converts the vendor ID which has been received by the communication means to a first letter string representing a maker's name, on the basis of the maker name table. This conversion means also converts the logical address which has been received by the communication means to a second letter string representing the device type of the device, on the basis of the device type table.

Even further, this video display device includes a display means which displays the first letter string and the second letter string which have been converted by the conversion means. The user may look at the first letter string and the second letter string which are displayed by the display means.

DETAILED DESCRIPTION OF THE INVENTION

Figure 1:
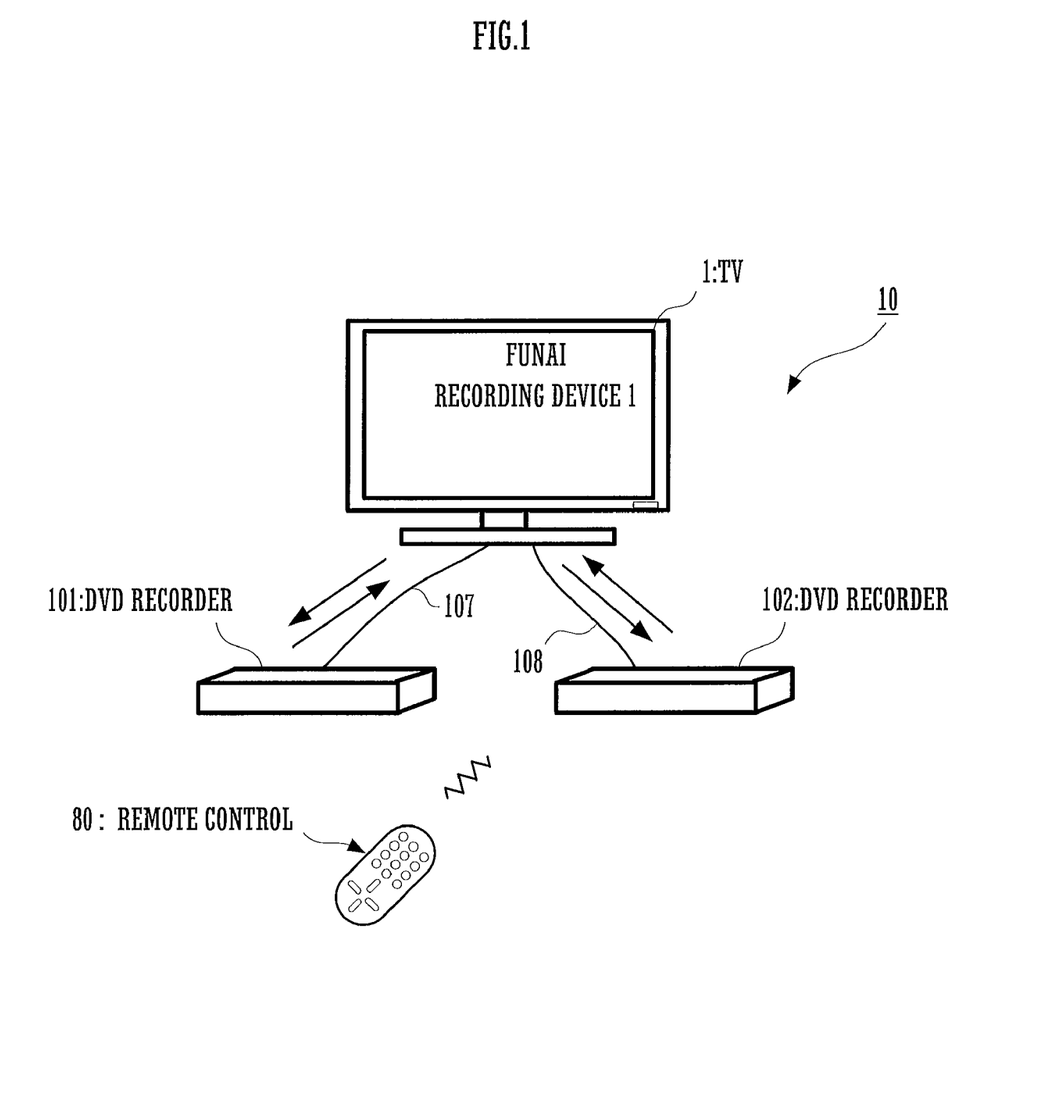
FIG. 1 is a structural system diagram showing a video replay system according to an embodiment of the present invention.

FIG. 1 is a structural system diagram showing a video replay system according to an embodiment of the present invention. This video replay system 10 comprises a DVD recorder 101, another DVD recorder 102, and a television 1.

The DVD recorders 101 and 102 and the television 1 conform to the HDMI-CEC standard. The DVD recorder 101 and the television 1 are connected together via an HDMI cable 107. Similarly, the DVD recorder 102 and the television 1 are connected together via an HDMI cable 108. Via the HDMI cables 107 and 108, the DVD recorders 101 and 102 and the television 1 transmit and receive between one another video signals and audio signals in digital format, and various types of control signals.

According to requirements, the DVD recorders 101 and 102 replay audio-visual signals recorded upon optical disks, and output these audio-visual signals (hereinafter termed "AV signals") to the television 1. Moreover, according to requirements, the DVD recorders 101 and 102 receive broadcast television signals and record them as AV signals upon optical disks.

The television 1 receives broadcast television signals and displays television programs upon its screen. Moreover, apart from the television channel which thus receives television broadcasts, the television 1 has a plurality of external input channels to which AV signals are inputted from devices which are connected to this television 1. The television 1 receives a command to changeover to a specific external input channel from a remote control 80. And, when the television 1 thus changes over to some external input channel, it receives an AV signal upon that external input channel. Then the television 1 outputs video and audio on the basis of that AV signal.

Furthermore, the television 1, the DVD recorder 101, and the DVD recorder 102 mutually acquire control information of various types from one another, by transmitting and receiving commands as specified by the CEC standard.

An example of such a television 1 which is an embodiment of the present invention will now be explained using FIG. 2. This television 1 comprises a reception unit 13, a signal processing unit 14, a control unit 15, a display unit 16, an actuation unit 18, and a HDMI communication unit 2. Moreover several HDMI devices, including DVD recorders 101 and 102, are connected to the television 1. This television 1 receives remote actuation from a remote control unit 80.

It should be understood that the HDMI communication unit 2 and the control unit 15 correspond to the "communication means" of the Claims. Moreover, the control unit 15 corresponds to the "conversion means" of the Claims. Furthermore, the actuation unit 18 and the remote control 80 correspond to the "actuation means" of the Claims. And the display unit 16 corresponds to the "display means" of the Claims.

From the broadcast television signals on all frequency bands received by the antenna 100, the reception unit 13 passes the frequency band of a specified physical channel which has been commanded from the control unit 15. Moreover, the reception unit 13 amplifies this broadcast television signal which it passes. And the reception unit 13 demodulates this passed through broadcast television signal into a TS (Transport Stream), which is digital data. And the reception unit 13 corrects any erroneous information in this TS. Here, program data for a plurality of virtual channels is transmitted upon the TS in multiplexed form.

The reception unit 13 includes a buffer memory. The reception unit 13 extracts packets of some single virtual channel which has been commanded from the control unit 15, and stores the data contained in these extracted packets in the buffer memory. AV data in the MPEG format or the like is contained in these packets. And the reception unit 13 extracts the AV data from the buffer memory, and outputs it to the signal processing unit 14.

Furthermore, the HDMI communication unit 2 is an interface which conforms to the HDMI-CEC standard. This HDMI communication unit 2 comprises a plurality of HDMI ports which are connected to a plurality of HDMI devices. The HDMI communication unit 2 receives AV signals in digital format which are transmitted from HDMI devices such as the DVD recorder 101 or the DVD recorder 102, and outputs them to the signal processing unit 14.

The signal processing unit 14 comprises a decoder 141, an adjustment processing unit 142, and an OSD combination unit 143. The decoder 141 separates the AV data which is inputted from the reception unit 13 or from the HDMI communication unit 2 into video data and audio data, and decodes these (for example by MPEG).

The adjustment processing unit 142 performs adjustments such as luminance adjustment, aspect ratio adjustment, scaling adjustment and so on upon the video data which has been decoded by the decoder 141.

On the basis of a command issued by the control unit 9, the OSD combination unit 143 creates an OSD (On Screen Display) consisting of letters, characters, symbols and the like. This OSD combination unit 143 internally stores various images. Thus, the OSD combination unit 143 stores, for example, letters, characters, drawings and so on for displaying various symbol strings. The OSD combination unit 143 outputs an OSD which it builds up based upon these letters, characters, drawings and so on. And, when video data is being outputted from the decoder 41, the OSD combination unit 143 puts together video based upon this video data and this OSD which it has built up, and outputs the video signal after combination to the display unit 16. Or it may also be arranged for the OSD combination unit 143 to prohibit output of any video signal based upon the video data, rather instead only outputting a video signal based upon the OSD which it has built up.

The display unit 16 may be, for example, a LCD (Liquid Crystal Display). This display unit 16 processes the video signal outputted from the signal processing unit 14, and displays an image upon the display surface of a liquid crystal panel.

The speaker 17 processes the audio signal outputted from the signal processing unit 14, and converts it to audio.

The actuation unit 18 receives actuation input for issuing commands to the television 1. Moreover, this actuation unit 18 receives actuation input for issuing commands to the DVD recorders 101 and 102. The actuation unit 18 has a plurality of actuation keys, and a reception unit 181 which receives infrared signals which arrive from the remote control 80. The remote control 80 is provided with a plurality of actuation keys, similar to those on the actuation unit 18. Among this plurality of actuation keys, for example, there is included a channel selection key which receives selection of a channel.

With this structure, the actuation unit 18 receives control codes corresponding to the actuation keys which are actuated by the user. And the actuation unit 18 transmits these control codes to the control unit 15.

The control unit 15 comprises a CPU 151, a RAM 152, and a ROM 153 for storing control data. The control unit 15 controls the operation of the various sections of the television 1 on the basis of control codes which are inputted by the actuation unit 18. The ROM 153 may be, for example, a flash memory. Modules 155, 156, and 157 for respectively performing CEC processing, channel changeover processing, and external input OSD processing subroutines are recorded in the ROM 153, along with a maker name table 158 and a device type table 159.

The CEC processing module 155 performs processing for transmitting various types of request to an HDMI device using the HDMI communication unit 2. When requests of various types are to be transmitted from the control unit 15 as explained below, the control unit 15 issues these requests by executing the CEC processing module 155.

The channel changeover processing module 156 performs processing for changing over the channel selected with the channel selection key of the actuation unit 18, from among a plurality of television channels and a plurality of external input channels.

And the channel display processing module 157 is a subroutine of the channel changeover processing module 156. This channel display processing module 17 performs processing to display the currently active channel upon the display unit 16, using the OSD combination unit 143. Moreover, this channel display processing module 157 performs processing for detecting the name of the maker who manufactured an HDMI device, and the device type of that HDMI device. With this channel display processing module 157, by communicating with the HDMI device via the HDMI communication unit 2, the control unit 15 acquires its vendor ID and its logical address or its physical address. Since these items of information are bit strings, in order for the user to be able to understand their contents, it is necessary for the control unit 15 to convert them into character strings. Thus, the control unit 15 converts these bit strings into character strings by using the maker name table 158 and the device type table 159, in which bit strings and character strings are held in mutual correspondence. The maker name table 158 is a table in which vendor IDs and letter strings which spell out the maker's names are kept in mutual correspondence (refer to FIG. 3). And the device type table 159 is a table in which logical addresses which are allocated to all of the devices connected to the television 1, and letter strings which spell out the device types of devices (such as a tuner, a player, and so on) are kept in mutual correspondence (refer to FIG. 4).

Next these logical addresses and the physical addresses will be explained using FIGS. 4 and 5.

Figure 4:
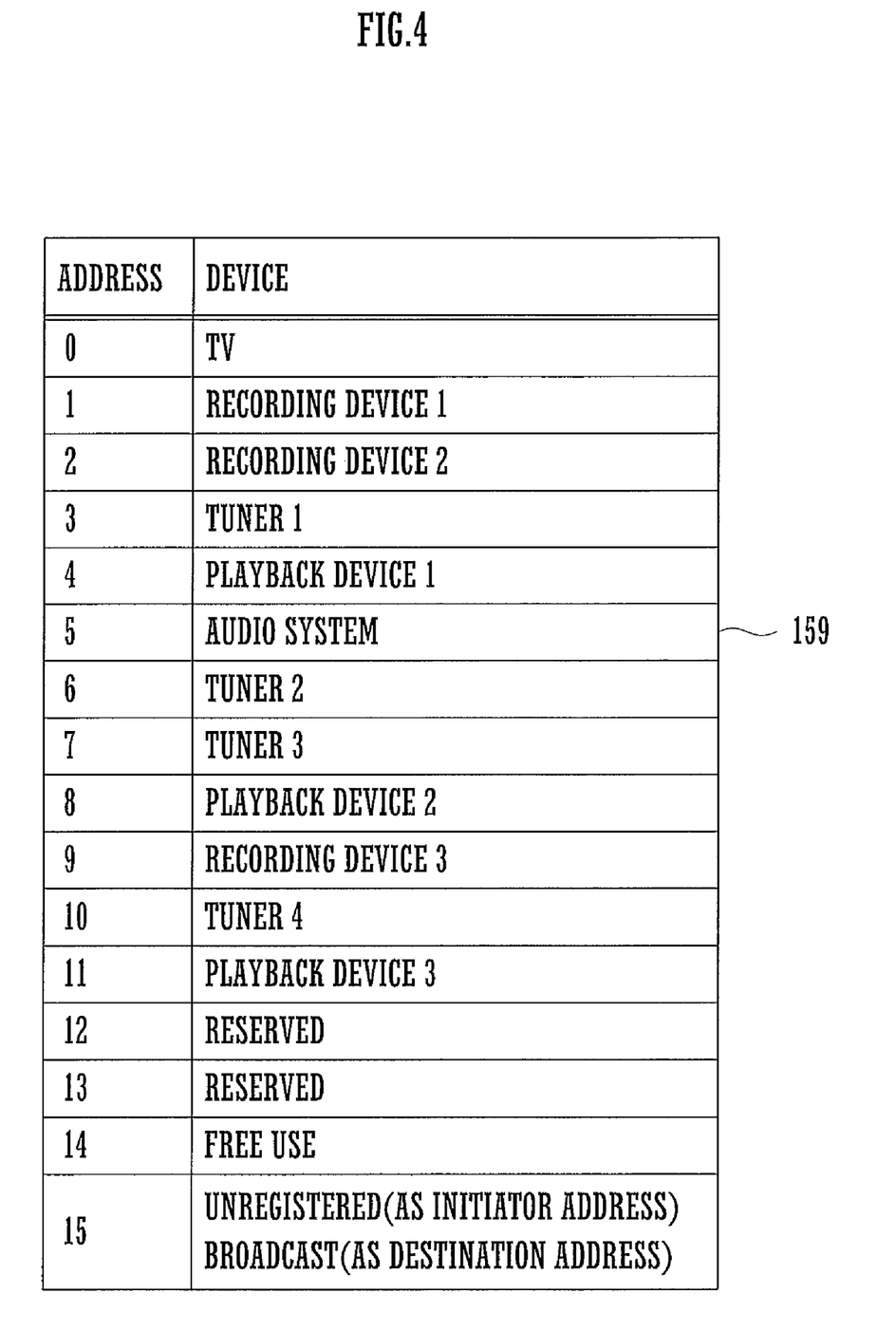
FIG. 4 is a figure showing a list of logical addresses in the HDMI-CEC standard.

FIG. 4 shows how device types are allocated to logical addresses. Examples of device types are "TV", "Recording Device", "Tuner", "Playback Device", and "Audio System". For example, when the power supply to the television 1 has been turned on, the control unit 15 transmits checking commands to all of the HDMI ports of the HDMI communication unit 2, for checking whether or not any devices are connected thereto. At this time, if an HDMI device is connected to some HDMI port, then a response is returned to the HDMI communication unit 2 from that HDMI device. The control unit 15 allocates logical addresses to all of the devices from which responses have been received, in such a manner that these logical addresses do not overlap one another. By doing this, the device type table 159 is constructed. Moreover, the HDMI communication unit 2 notifies the logical address which it has allocated to each HDMI device, to that HDMI device. And, even if there are several connected HDMI devices of the same device type, the control unit 15 is able to distinguish between different ones of these devices on the basis of this device type table 159, since this distinction is not performed simply on the basis of the device type, but rather on the basis of the logical addresses.

However, apart from tuners, it is not possible to distinguish between more than three HDMI devices of the same device type. If four or more HDMI devices of the same device type have been connected, the control unit 15 is only able to distinguish three of them individually. Thus the logical address of "15" which means "unregistered" is allocated to the fourth and subsequent devices of the same type, and the control unit 15 is not able to distinguish the device types of these devices. In this case, the control unit 15 distinguishes the device types of the devices by using their physical addresses.

Figure 5:
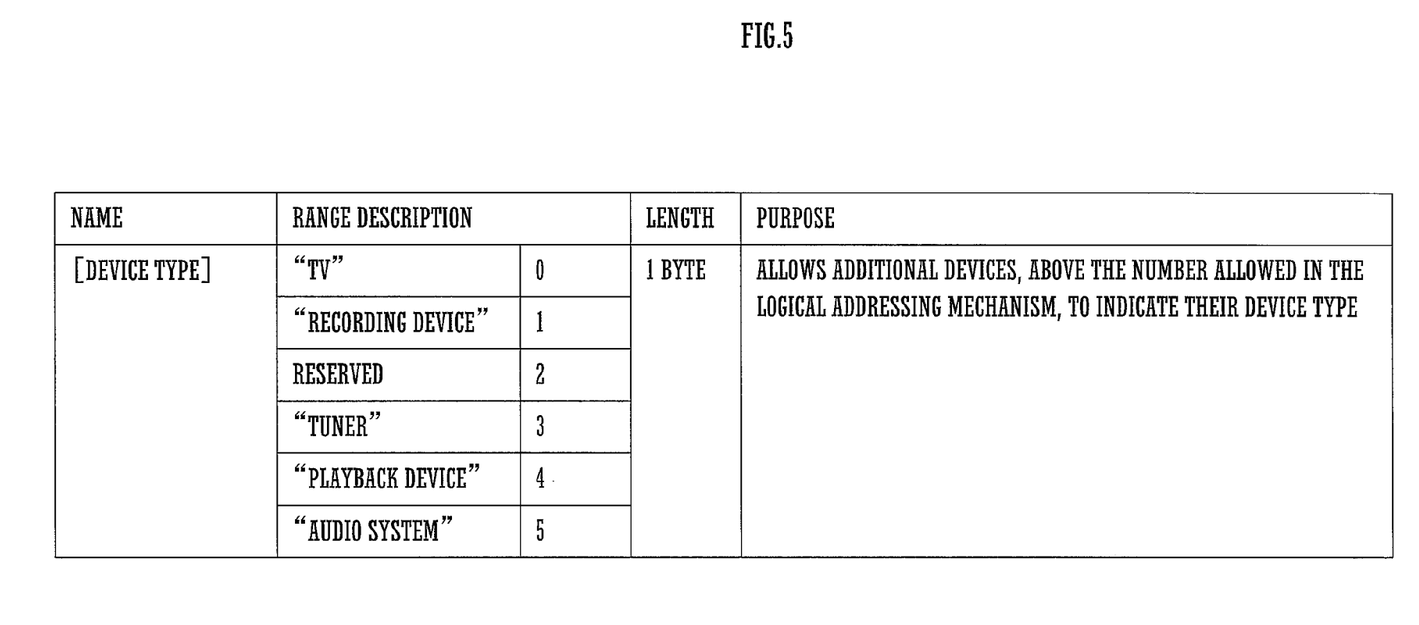
FIG. 5 is a figure showing a list of device types in the HDMI-CEC standard.

FIG. 5 shows the "device types of devices" which are returned corresponding to the physical addresses from the HDMI devices, in response to request commands which have been outputted to the HDMI devices. The request commands are commands which request physical addresses from the HDMI devices. One of the request commands is called "Give Physical Address". The device types of the devices shown in FIG. 5 are only a method for determining the device types of the devices. Due to this, if a plurality of HDMI devices of the same device type are connected, the control unit 15 is not able to tell them apart.

Next, examples of screens which are displayed by the television 1 will be explained using FIGS. 6A through 6D. FIGS. 6A through 6D assume a situation in which certain HDMI devices are connected to the television 1, and control information can be acquired from these HDMI devices. In these figures, "FUNAI" is an example of display of a maker's name. Moreover, "PLAYER" is an example of display of a device type. The device type of a device may be acquired from either the device type information or the logical address which correspond to its physical address. This display of the maker's name and the device type of the device is not to be considered as being limited to "FUNAI" and to "PLAYER". but change according to the HDMI device or devices which are connected.

Figure 6A:
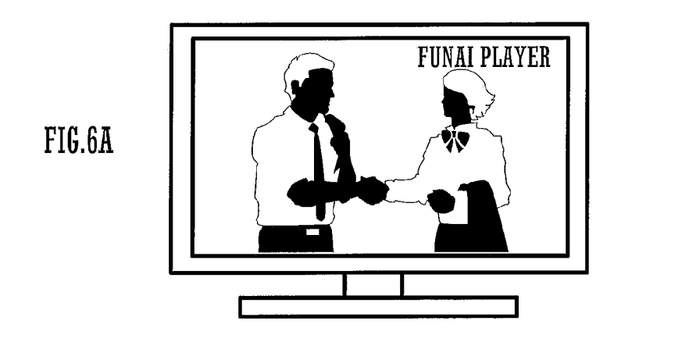
FIGS. 6A through 6D are figures showing examples of displays upon a TV of this embodiment.

In FIG. 6A, "FUNAI PLAYER" is displayed in the corner of the screen. This means that "HDMI port 1" has been selected as the external input channel. Moreover, if "HDMI port 2" has been selected as the external input channel, then "FUNAI TUNER" is displayed.

Figure 6B:
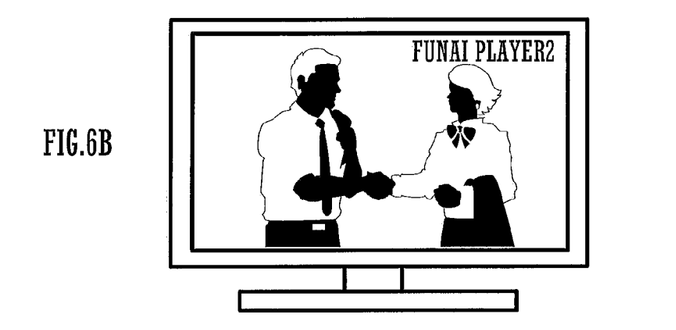

FIG. 6B is an example of a display when a plurality of devices having the same maker and of the same device type are connected.

In this case, they are distinguished by displaying "FUNAI PLAYER 1" or "FUNAI PLAYER 2". In this case, running numbers may be allocated to the different devices. By doing this, the display distinguishes between different devices having the same maker and of the same device type.

Figure 6C:
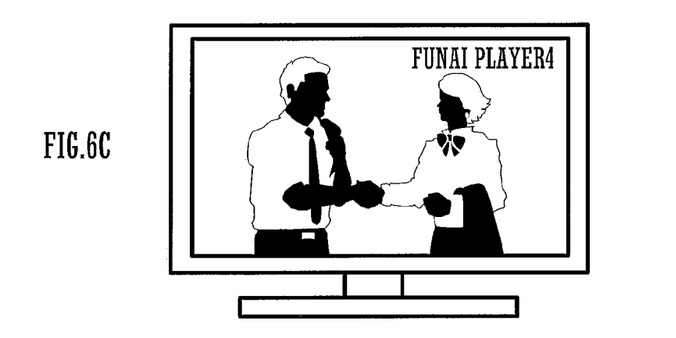

FIG. 6C is an example of a display when four or more devices of the same device type are connected. In this case, in the device type table 159 shown in FIG. 4, all of the devices from the fourth one on are "unregistered". Thus, the HDMI communication unit 2 transmits a physical address request command to the HDMI device. And the control unit 15 acquires the device type of the device from the device type information that is returned in correspondence to the physical address. The control unit 15 displays the maker name and the device type of the device as "FUNAI PLAYER 4".

Figure 6D:
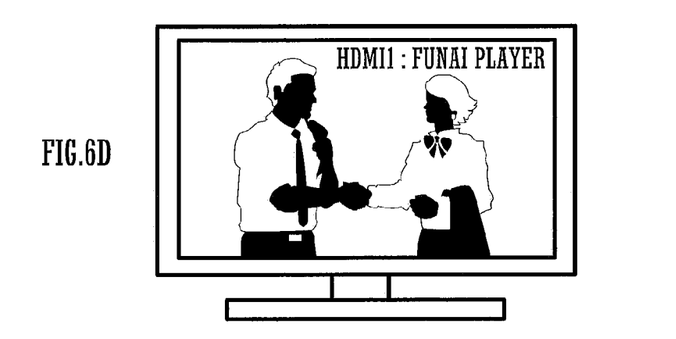

FIG. 6D shows an example of a display of maker's name and device type of a device, along with the external input channel number. For the method of display of the maker's name and the device type of the device in FIG. 6D, the display method of FIGS. 6A through 6C is applied.

By the above, it is possible for the user to ascertain which HDMI device is connected to the external input channel which he has selected with the channel selection key, by inspecting the screen as in FIGS. 6A through 6D.

Figure 7:
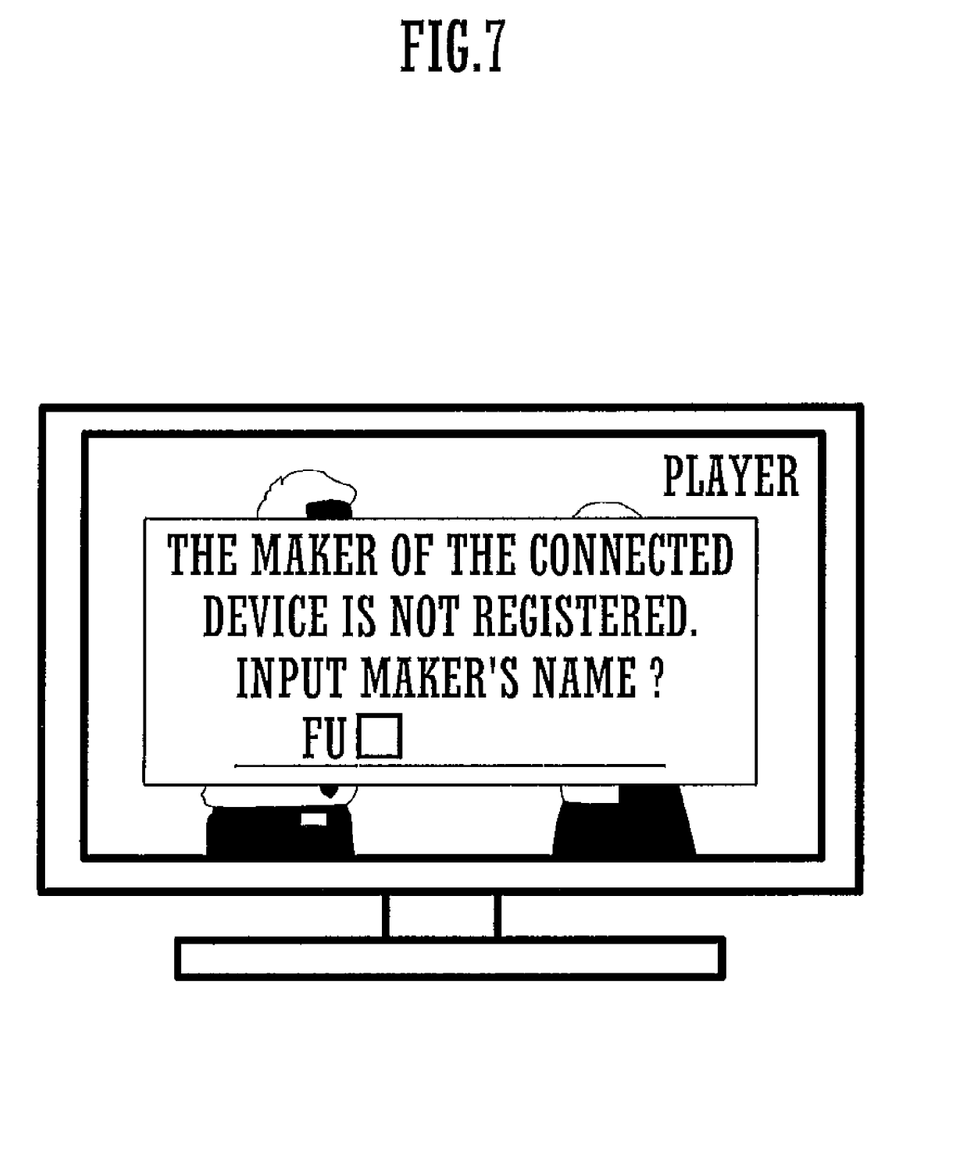
FIG. 7 is a figure showing an example of a display upon this TV.

Next, using FIG. 7, a case will be explained in which an HDMI device has been connected, whose maker's name is not registered in the maker name table 158. FIG. 7 is an example of a screen which is displayed in this case. As shown by way of example in FIG. 7, "The maker of the connected device is not registered. Input maker's name?" is displayed. And the control unit 15 receives input of a letter string from the remote control unit 80. "☐" shows the position where the current letter can be inputted. When the vendor ID and the maker's name are inputted from the remote control 809, the control unit adds this vendor ID and maker's name to the maker name table 158 (refer to FIG. 3). The vendor ID is an ID which is uniquely allocated to the maker from the IEEE. Due to this, when the user registers the vendor ID and the maker's name together upon the screen shown in FIG. 7, there is no need for the user to perform registration for a second time, even if a device of some other device type made by the same maker is connected.

It should be understood that the control unit 15 may acquire the logical addresses when the power supply to the television 1 is turned on. Due to this, when registering the maker's name upon the screen shown in FIG. 7, it would also be acceptable to arrange for the control unit 15 to display the device type of the device in the corner of the screen of the television screen 1.

Next, using the flow chart shown in FIG. 8, the operations performed by the control unit 15 while executing the channel display processing module 157 will be explained. These operations are performed when the user selects, with the channel selection key, some external input channel which he desires. In this embodiment, in the following explanation, it will be supposed that the external channel key which the user has selected with the channel selection key is the channel to which the DVD recorder 101 is connected.

Figure 8:
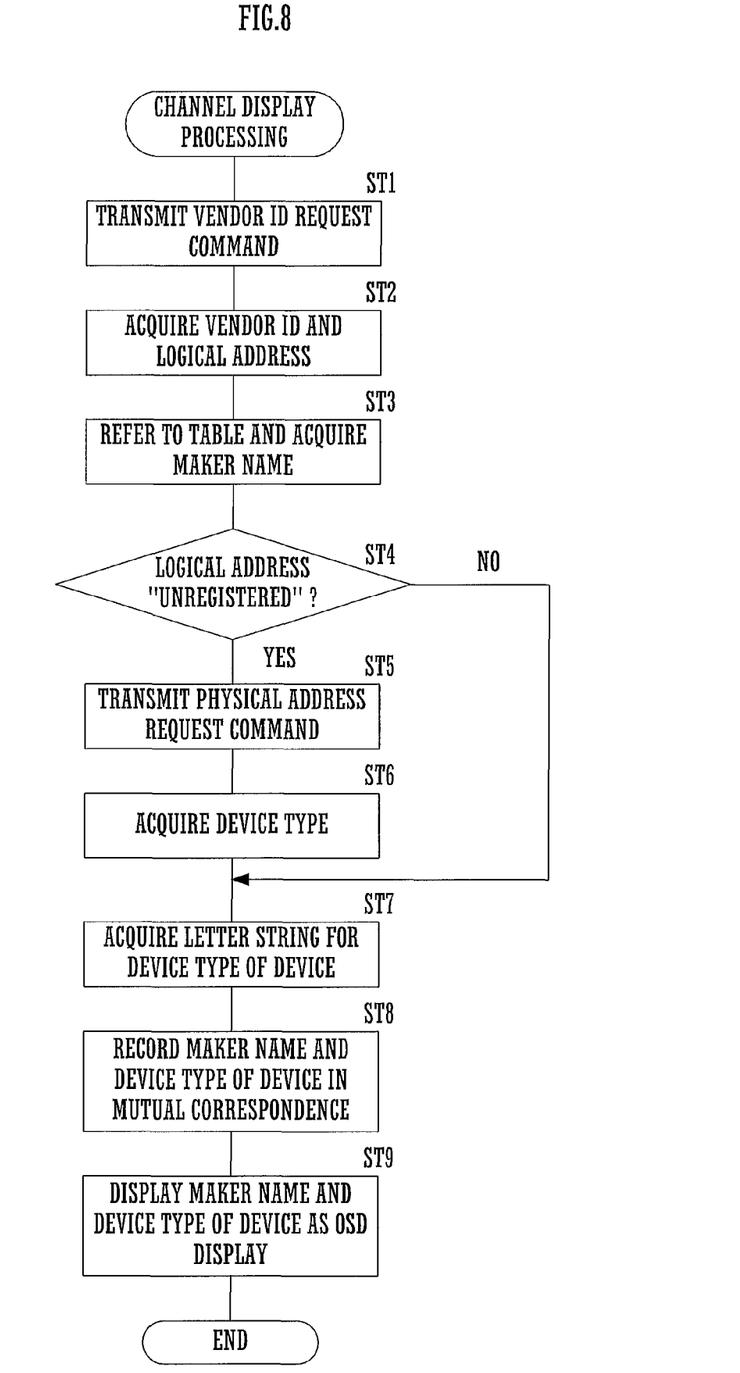
FIG. 8 is a flow chart showing operations performed by a control unit of the TV of the above described video replay system during channel display processing.

It should be understood that the device type table 159 shown in FIG. 4 is constructed in advance by the control unit 15 before the channel display processing module 157 shown in FIG. 8 is executed (for example, when the power supply to the television 1 is turned on), and is stored in the ROM 153.

First, the control unit 15 outputs a vendor ID request command from the HDMI communication unit 2 to the DVD recorder 101 (a step ST1). Due to this, the DVD recorder 101 returns the vendor ID of this DVD recorder 101 and its own logical address which has been allocated in advance. Here, the vendor ID is stored in advance in the memory of this HDMI device. Moreover, the vendor ID is an ID which is allocated uniquely to the maker from the IEEE. However, the vendor ID is not generally known. Accordingly, the construction of this maker name table 158 is performed by the maker who has manufactured the television 1 enquiring about HDMI devices from various different makers in advance. Moreover, as described with reference to FIG. 7, it is also possible to receive registration from the user for an HDMI device manufactured by a maker who is not registered.

Next, the control unit 15 receives the vendor ID and the logical address via the HDMI communication unit 2 (a step ST2).

Figure 3:
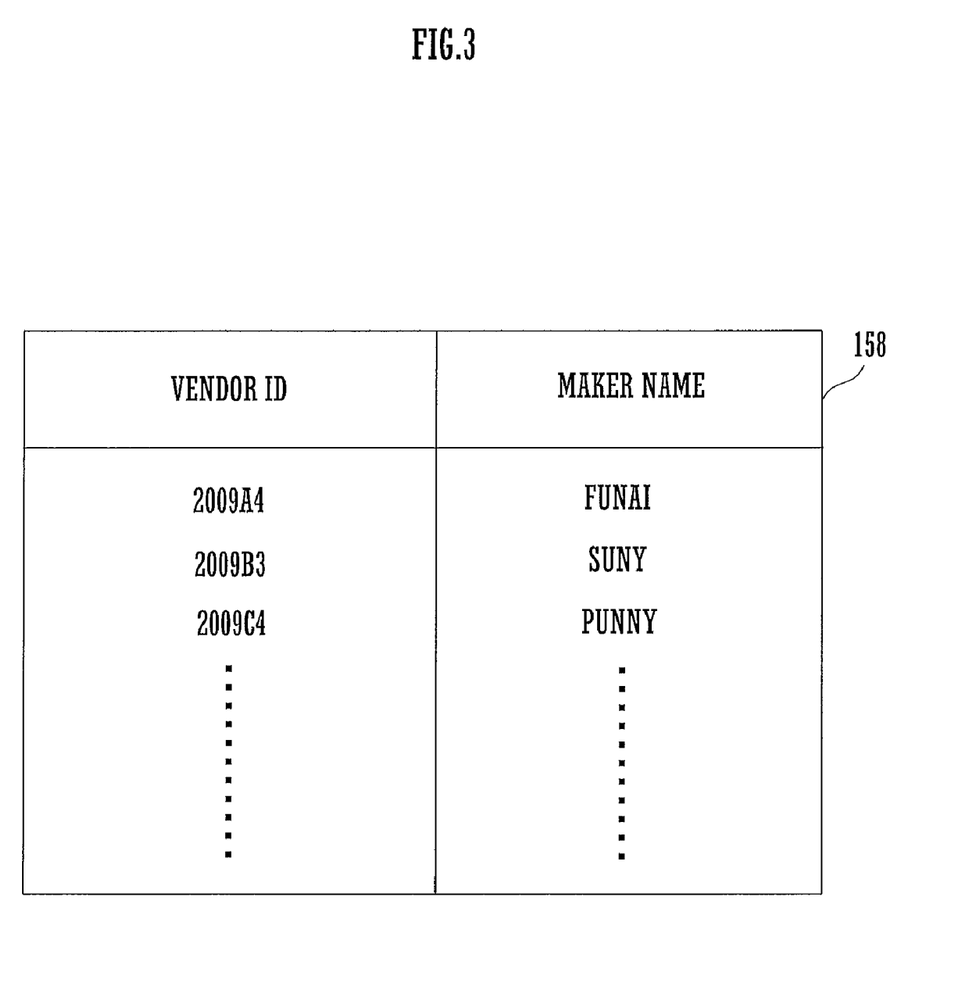
FIG. 3 is a figure showing a maker name table which maintains a correspondence between vendor IDs and maker names.

The control unit 15 refers to the maker name table 158 shown in FIG. 3, and converts the vendor ID which has been received to a first letter string which consists of the maker's name (a step ST3).

Then the control unit 15 decides, on the basis of the device type table 159 shown in FIG. 4, whether or not the logical address which has been received is #15 ("unregistered") (a step ST4). And the control unit 15 executes the following steps ST5 and ST6, only if the logical address is #15 ("unregistered") (YES in the step ST15).

The control unit 15 transmits to the communication unit of the DVD recorder 101, from the HDMI communication unit 2, a request command which requests the physical address of the DVD recorder 101 (a step ST5). And the communication unit of the DVD recorder 101 returns the physical address of this DVD recorder 101 and device type information corresponding to that physical address (refer to FIG. 5).

The control unit 15 then receives this physical address and device type information via the HDMI communication unit 2 (a step ST6).

And, on the basis of the device type table 159, the control unit 15 converts this logical address or device type information to a second letter string which specifies the device type of the device (a step ST7).

Then the control unit records the maker's name, the device type of the device, and the HDMI port number in the ROM 153 in mutual correspondence (a step ST8).

And the control unit 15 outputs the first letter string and the second letter string to the OSD combination unit 143 (a step ST9). Then the OSD combination unit 143 combines an OSD which displays these letter strings and the video signal, and outputs the result to the display unit 16. Due to this, in this embodiment, a screen such as that shown in FIG. 1 is displayed. And, by looking at this screen, the user is able to ascertain the type of device that the HDMI device connected to the external input channel that he has selected with the channel selection key is.

It should be understood that while, in FIG. 8, the steps ST4 through ST7 are executed after the step ST3, it would also be acceptable to execute the step ST3 and the steps ST4 through ST7 in parallel. Moreover, it would also be acceptable to execute the step ST3 after having executed the steps ST4 through ST7.

In the following, additional explanation regarding possible variations upon the embodiment described above is provided.

In the above, the use of DVD recorders 101 and 102 has been explained. However, in actual implementation, the present invention could be applied to a TV game apparatus, a video camera, a digital camera, or a Blu-ray player or the like. In a similar manner, the present invention could be applied to a monitor, instead of to the television 1. Moreover, rather than being a liquid crystal type television, the television 1 could be built around a plasma monitor, an EL monitor, a cathode ray tube, a projector, or the like.

Furthermore, while in FIG. 1 two HDMI devices were connected to the television 1, the present invention can be applied to any configuration in which at least one HDMI device is connected.

Figure 2:
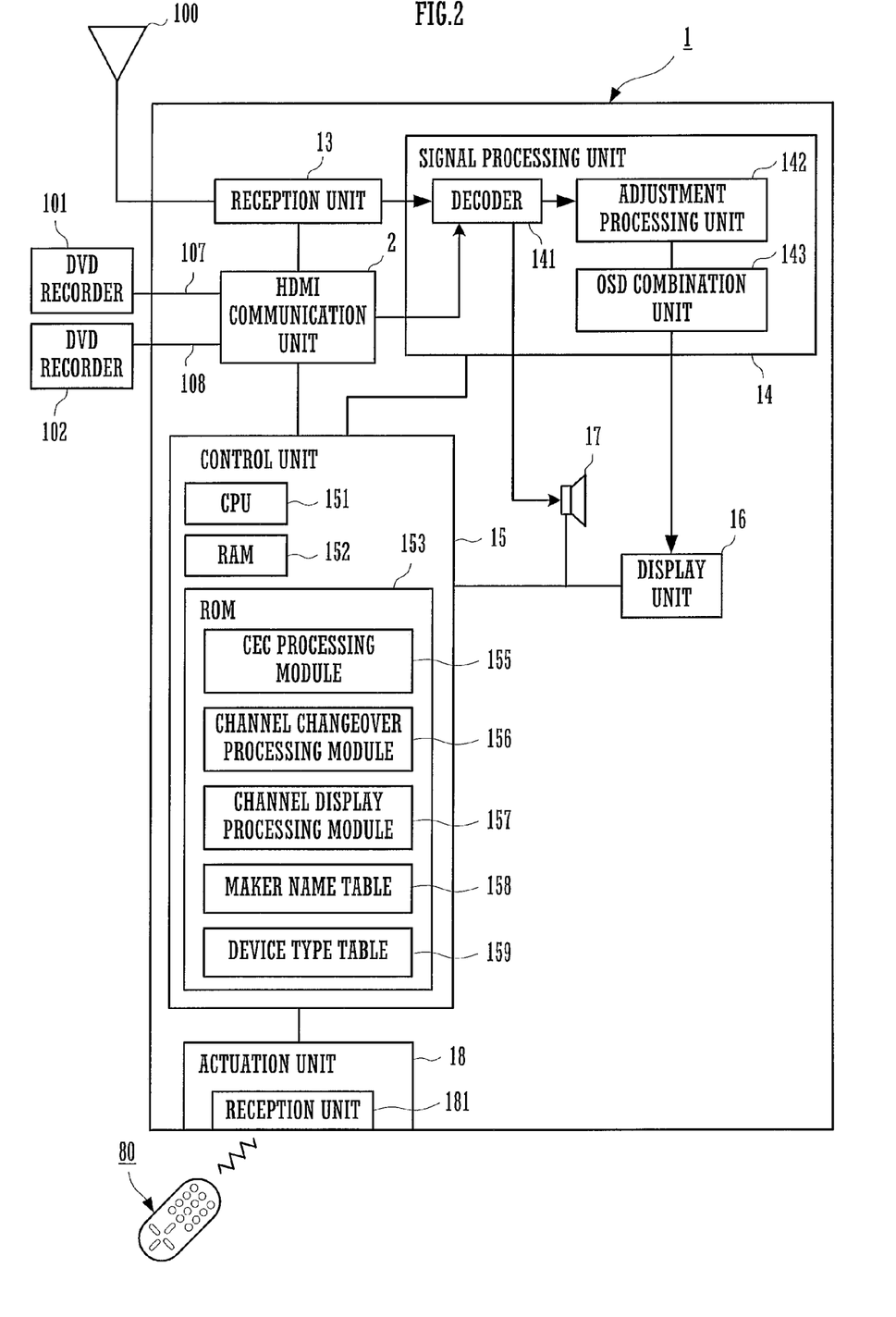
FIG. 2 is a block diagram showing the structure of the main portion of a TV of the above described video replay system.

While, in FIG. 2, the structure was functionally separated into blocks, in actual implementation, any one or any combination of these functions may be integrated into a system IC. Moreover, one of these blocks may also be separated into a plurality of distinct structures. For example, the control unit 15 and the signal processing unit 14 may be combined together into a single system IC.

Yet further, the ROM 153 in which the maker name table 158 and the device type table 159 are recorded corresponds to the "storage means" of the Claims. And the storage means in which the maker name table 158 and the device type table 159 are stored may be provided externally to the control unit 15, provided that it is connected so that the control unit 15 can access it.

Furthermore, as another embodiment of the present invention, a configuration would also be possible in which the reception unit 13 receives, not a TS, but a PS (program stream).

While, on the screens of FIGS. 6A through 6D, the maker name and the device type of the device are displayed at the upper right of the screen, it would also be acceptable for them to be displayed in some other position.

What is claimed is:
1. A video display device, comprising:
   a maker name table in which vendor IDs for specifying makers who have manufactured devices connected to the video display device according to an HDMI standard and makers' names, are held in mutual correspondence;

a device type table in which a plurality of logical addresses which are allocated in advance to all devices connected to the video display device, and device types of the all devices, are held in mutual correspondence;

communication means which, when some external input channel is selected, receives, from a device upon the external input channel, a vendor ID and a logical address which is allocated in advance to the device on the external input channel, by communicating with the device upon the external input channel;

conversion means which converts the vendor ID received by the communication means to a first letter string representing a maker's name, on the basis of the maker name table, and also converts the logical address received by the communication means to a second letter string representing a device type of the device, on the basis of the device type table;

display means which displays the first letter string and the second letter string which have been converted by the conversion means; and actuation means which receives input of a vendor ID and a maker's name, wherein the conversion means adds the vendor ID and the maker's name inputted via the actuation means to the maker name table.

2. The video display device according to claim 1, wherein, if it is not possible to acquire the device type of the device from the logical address which has been received, the communication means acquires device type information specifying the device type of the device from the device by transmitting to the device a command which requests physical address of the device; and the conversion means converts the device type information to the second letter string.

3. The video display device according to claim 1, wherein, if a plurality of devices having the same device type and moreover the same maker's name are connected to the video display device, the display means displays a symbol which distinguishes those devices apart together with the first letter string and the second letter string.

4. The video display device according to claim 1, wherein the display means also displays a channel number of the external input channel which has been selected, together with the first letter string and the second letter string.

* * * * *